(12) United States Patent
Keeney et al.

(10) Patent No.: US 6,420,052 B1
(45) Date of Patent: Jul. 16, 2002

(54) ENCAPSULATED ANTI-CORROSION COATING

(75) Inventors: Chris Keeney, Troy; Mark Clements, Lapeer, both of MI (US); Jim Hawkins, Cookeville, TN (US); Steve Yollick, Troy; Joe Fader, Brighton, both of MI (US)

(73) Assignee: Meritor Light Vehicle Technology, Inc., Troy, MI (US)

( * ) Notice: Subject to any disclaimer, the term of this patent is extended or adjusted under 35 U.S.C. 154(b) by 0 days.

(21) Appl. No.: 09/566,370

(22) Filed: May 8, 2000

(51) Int. Cl.[7] ............................................. B21D 29/00
(52) U.S. Cl. ..................... 428/621; 428/615; 428/935; 428/321.5
(58) Field of Search ................ 428/621, 657, 428/926, 935, 615, 321.5

(56) References Cited

U.S. PATENT DOCUMENTS

| | | | | |
|---|---|---|---|---|
| 4,060,032 A | * | 11/1977 | Evans | 101/401.1 |
| 4,329,402 A | * | 5/1982 | Hyner et al. | 428/621 |
| 5,275,892 A | * | 1/1994 | Hyner et al. | 428/648 |
| 5,635,574 A | * | 6/1997 | Aoyagi et al. | 526/212 |

* cited by examiner

Primary Examiner—Merrick Dixon
(74) Attorney, Agent, or Firm—Carlson Gaskey & Olds

(57) ABSTRACT

A coating for an article includes coating encapsulated micro-spheres which maintain the coating in a fluid state. The coating encapsulated micro-spheres are retained in the coating to form a matrix of hardened coating and coating encapsulated micro-spheres. Damage to the coating form a fissure which breaks open the coating encapsulated micro-spheres adjacent the fissure. The broken coating encapsulated micro-spheres release the fluid coating material contained therein. Because the coating encapsulated micro-spheres release the encapsulated coating material in the fluid state the coating material flows into the fissure to coat the exposed substrate. This provides a "self-healing" ability to the coating which protects the substrate even after the coating is damaged.

15 Claims, 1 Drawing Sheet

ENCAPSULATED ANTI-CORROSION COATING

BACKGROUND OF THE INVENTION

The present invention relates to the field of metal coating, more specifically to a coating containing coating encapsulated microspheres which improve the corrosion resistance of an article by dispensing the encapsulated coating when the article is injured.

A persistent problem is to provide metal articles which are resistant to corrosion that inherently attacks such articles in normal usage. With some metal articles, the need to provide the maximum degree of corrosion resistance is particularly great, in view of the corrosive environments in which they are utilized. For example, vehicle components are typically exposed to corrosive salts and other corrosive agents which would cause rapid deterioration, both functionally and aesthetically. Numerous other articles made of metals must be protected or corrosion will eventually occur.

It is well known that the corrosion resistance of metal articles can be improved by applying coatings, either in single or multiple layers. Such layers provide greater inherent resistance to attack by corrosive agents. For example, it is known that improvements in the corrosion resistance of a metal substrate can be achieved by applying coatings such as electroplating, paints, dyes, and chromate films.

However, such coatings can be damaged during normal wear. This is particularly a concern in metal parts which flex during use such as suspension components, coil springs, actuators, etc. The coating is prone to crack at the flexed areas. When the coating becomes damaged or cracks, a path in a localized area of the article is opened to the metal substrate. The corrosive agents can then directly attack the metal substrate and the article rapidly deteriorates in the localized area. Typically, damage in the localized area requires the repair or replacement of the entire article.

It is therefore desirable to provide an anti-corrosion coating that is self-healing and blocks a path opened to the metal substrate.

SUMMARY OF THE INVENTION

The coated article according to the present invention includes a coating having coating encapsulated microspheres which maintain the coating in a fluid state until the micro-spheres are ruptured.

The substrate is preferably a vehicle component such as a spring or suspension component which is typically subjected to flexing and operates in a high corrosion environment. However, the type of substrate, or the form in which it is provided for treatment in accordance with the invention, is not limited to any particular part.

The coating is preferably an anti-corrosion coating such as a paint or undercoating which contains a quantity of coating encapsulated micro-spheres. The coating encapsulated micro-spheres are manufactured to encapsulate a coating material in a fluid state. The coating encapsulated micro-spheres are retained in the coating to form a matrix of hardened coating and coating encapsulated micro-spheres which maintain the coating material in the fluid state. By incorporating a mix of different coating encapsulated microspheres which encapsulate different fluid coatings, a multiple of properties can be incorporated directly into the coating. The coating may therefore be tailored to provide desired anti-corrosion properties.

With the present invention, damage to the coating which causes a fissure in the coating also breaks open the coating encapsulated micro-spheres adjacent the crack or fissure. The broken coating encapsulated micro-spheres release the fluid coating material contained therein. Because the coating encapsulated micro-spheres release the encapsulated coating material in the fluid state the coating material flows into the fissure to coat the exposed substrate. This provides a "self-healing" ability to the coating which protects the substrate even after the coating is damaged.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
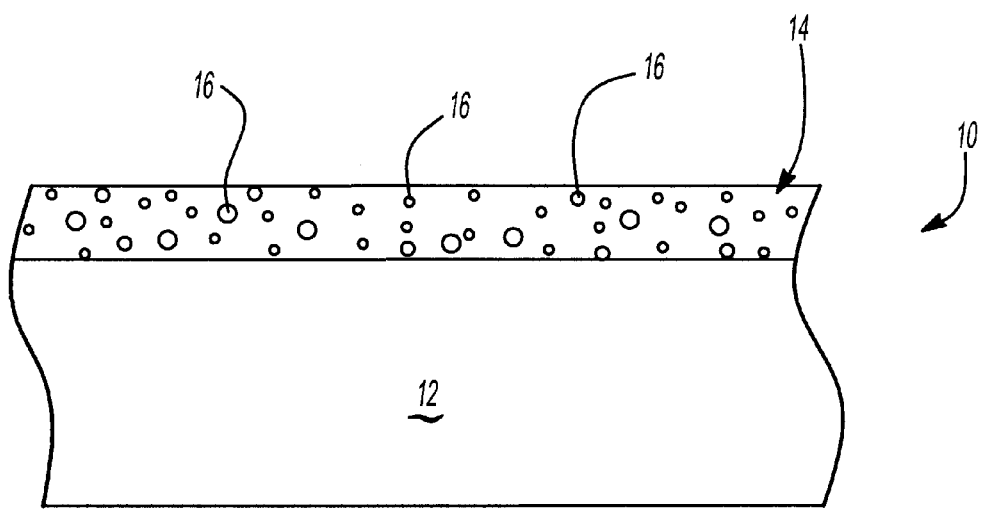
FIG. 1 is a general sectional view of a coated article having a coating according to the present invention.

FIG. 1 illustrates a coated article 10 according to the present invention. The article 10 generally includes a substrate 12 and a coating 14 having coating encapsulated micro-spheres 16. Preferably, substrate 12 is a metal part.

The substrate 12 according to the present invention is representative of a vehicle component such as a spring or suspension component which is typically subjected to a high corrosion environment. The present invention is particularly applicable to highly stressed parts, such as springs which are almost continuously flexed while being exposed to high corrosion environment. Although a suspension component is used for illustrative purposes it is within the scope of the present invention that the coating and method can be applied to any component which will benefit from a protective coating. The type of substrate 12, or the form in which it is provided for treatment in accordance with the invention, is not limited within this invention.

The coating 14 is preferably an anti-corrosion coating such as a paint or undercoating. The coating 14 is applied to the substrate 12 by conventional processes such as spraying or dipping which forms no part of the present invention. The coating 14, however, is novel in that it contains a quantity of coating encapsulated micro-spheres 16. Frangible micro-spheres or micro-balloons are known. The coating encapsulated micro-spheres 16 are manufactured by known manufacturing processes to contain a coating material 18 in a fluid state. This technology has been used for contact paper wherein ink is encapsulated for form duplication. The present invention, however, uses this technology to encapsulate a fluid coating for the purposes described. Although a single coating is illustrated it will be understood that a multiple of coating 14 layers are encompassed within the present invention.

The coating encapsulated micro-spheres 16 are manufactured to preferably contain the coating material 18 such as the material forming the coating 14, a different coating material, or combinations of various coating materials having various coating and ant-corrosion properties in a fluid state. The coating encapsulated micro-spheres 16 are retained in the coating 14 to form a matrix of hardened coating 14 and coating encapsulated micro-spheres 16 which maintain the coating material in the fluid state. By incorporating a mix of different coating encapsulated micro-spheres 16 which encapsulate different fluid coating, a multiple of properties can be incorporated directly into the coating 14. The coating 14 may therefore be tailored to provide desired anti-corrosion properties.

Figure 2:
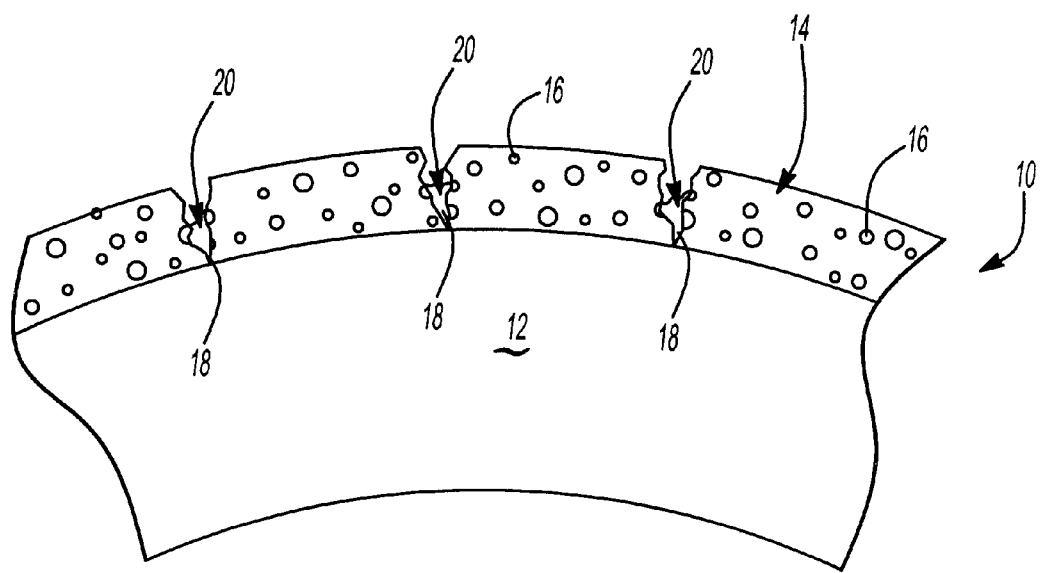
FIG. 2 is a general sectional view of a coated article according to the present invention while being flexed.

Referring to FIG. 2, the article 10 is shown in a flexed condition. Continual flexing of the coating article 10 may cause the coating to crack and form fissures 20 which can extend to the substrate 12. These fissures 20 may also be caused in a more immediate fashion by direct contact with an object that causes a scratch or break in the coating 14. Typically such a crack exposes the substrate 12 and leaves the substrate 12 unprotected against the environment and resulting corrosion.

According to the present invention, however, the cracking of the coating 14 also breaks open the coating encapsulated micro-spheres 16 adjacent the fissure 20. The broken coating encapsulated micro-spheres 16 release the fluid coating material 18 contained therein. Because the coating encapsulated micro-spheres 16 release the encapsulated coating material 18 in the fluid state the coating material 18 flows into the fissure 20 and coats the exposed substrate 12. This provides a "self-healing" ability to the coating which protects the substrate 12 even after the coating 14 is damaged.

The present invention therefore provides a self-healing coating which dramatically increases the anti-corrosion protection of an article while maintaining a relatively inexpensive coating application process commonly practiced in the art.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A coated article comprising:

a substrate;

a coating adjacent said substrate, said coating having frangible coating encapsulated micro-spheres for release of said encapsulated coating material.

2. The coated article as recited in claim 1, wherein said coating is an anti-corrosion coating.

3. The coated article as recited in claim 1, wherein said coating is a paint.

4. The coated article as recited in claim 1, wherein said coating is a plurality of layers of coating.

5. The coated article as recited in claim 1, wherein said substrate is a metal part.

6. The coated article as recited in claim 1, wherein said substrate is a vehicle component.

7. The coated article as recited in claim 6, wherein said vehicle component is a suspension component.

8. The coated article as recited in claim 6, wherein said vehicle component is a spring.

9. A coated article comprising:

a substrate;

a coating matrix adjacent said substrate, said coating matrix having a hardened coating, and micro-spheres containing an encapsulated coating material in a fluid state suspended within said hardened coating, wherein upon damage to said hardened coating, said micro-spheres release said encapsulated coating material.

10. The coated article as recited in claim 9, wherein said micro-spheres are at least two types of micro-spheres, each type containing a different encapsulated coating material.

11. The coated article as recited in claim 9, wherein said substrate is a vehicle component.

12. The coated article as recited in claim 11, wherein said vehicle component is a suspension component.

13. The coated article as recited in claim 11, wherein said vehicle component is a spring.

14. The coated article as recited in claim 11, wherein vehicle component is a metal part.

15. The coated article as recited in claim 1, wherein upon later damage to said coating, said micro-spheres break open and release said encapsulated coating material.

* * * * *